United States Patent
Berko et al.

(10) Patent No.: US 12,255,924 B2
(45) Date of Patent: Mar. 18, 2025

(54) POLICY CREATION AND ADJUSTMENT METHODS

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 295 days.

(21) Appl. No.: 17/804,824

(22) Filed: May 31, 2022

(65) Prior Publication Data
US 2023/0388347 A1  Nov. 30, 2023

(51) Int. Cl.
*H04L 9/40* (2022.01)
*G06N 20/00* (2019.01)

(52) U.S. Cl.
CPC ............. *H04L 63/20* (2013.01); *G06N 20/00* (2019.01); *H04L 63/102* (2013.01); *H04L 63/104* (2013.01)

(58) Field of Classification Search
CPC ..... H04L 63/20; H04L 63/102; H04L 63/104; H04L 63/10; H04L 63/02; H04L 63/0227; H04L 63/0263; H04L 63/101; G06N 20/00; G06N 3/006; G06N 5/025; H04W 12/08; H04W 12/088; H04W 12/60; H04W 12/63; H04W 12/64
See application file for complete search history.

(56) References Cited

U.S. PATENT DOCUMENTS

| | | | |
|---|---|---|---|
| 9,270,559 B2 | 2/2016 | Raleigh et al. | |
| 9,572,125 B1* | 2/2017 | Wang | H04W 12/64 |
| 10,547,646 B2 | 1/2020 | Joseph et al. | |
| 11,201,873 B2* | 12/2021 | Zhong | G10L 17/08 |
| 11,356,416 B2 | 6/2022 | Yin et al. | |
| 11,394,738 B2 | 7/2022 | Kulaga et al. | |
| 2005/0060561 A1 | 3/2005 | Pearson et al. | |
| 2009/0055382 A1* | 2/2009 | Kerschbaum | G06Q 10/06 707/999.005 |
| 2012/0084108 A1 | 4/2012 | Bohannon et al. | |
| 2012/0210388 A1 | 8/2012 | Kolishchak | |
| 2017/0108839 A1* | 4/2017 | Ganesan | F24F 11/30 |
| 2018/0288063 A1* | 10/2018 | Koottayi | G06F 21/50 |
| 2020/0162516 A1* | 5/2020 | Israel | G06F 21/566 |

FOREIGN PATENT DOCUMENTS

| | | |
|---|---|---|
| CN | 108023768 B | 5/2019 |
| CN | 109792439 A | 5/2019 |
| CN | 110418022 B | 4/2021 |
| JP | 2017130111 A | 7/2017 |
| WO | WO2018120246 A1 | 7/2018 |

* cited by examiner

*Primary Examiner* — Shaqueal D Wade-Wright
(74) *Attorney, Agent, or Firm* — ESPE Legal Consultancy FZ-LLC (57) ABSTRACT

A system to create Data Loss Prevention (DLP) policies and adjust DLP policies over time in a computing system using agents running at an endpoint to intercept a data transfer in a network traffic. New data flow/DLP policy rules are created and updated with reference to behavior data of trusted and untrusted users.

20 Claims, 5 Drawing Sheets

Data flow policy / user interface example 202

| Filter 204 | | | |
|---|---|---|---|
| Sender 206 | Recipient 208 | Permission 210 | Action 212 |
| Group 1  Sensitive PHI  220 | | | |
| Any internal 222 | Any external contacts 224 | Exception 226 | No action 228 |
| Any internal 230 | User 1 232 | Allow 234 | Log, Manual enforcement 236 |
| Any internal 238 | Other 240 | Deny 242 | Log, Alert, Automatic enforcement 244 |
| Group 2  Sensitive PII  250 | | | |
| User 1 252 | Any internal contact 254 | Allow 256 | No action 258 |
| Any internal 260 | @bank.com 262 | Allow 264 | Log, Manual enforcement 266 |
| Any internal 268 | Facebook, Instagram, External storage 270 | Exception 272 | Log, Alert, Automatic enforcement 274 |
| Group N  Non sensitive  280 | | | |
| User 1 282 | Any internal contact 284 | Allow 286 | Log 288 |

POLICY CREATION AND ADJUSTMENT METHODS

TECHNICAL FIELD

The present invention pertains to computer systems and methods for protection of the data at these systems by automatic creation and adjustment of Data Loss Protection (DLP) policies.

BACKGROUND

Data Loss Prevention (DLP) solutions are security tools that help organizations to ensure that sensitive data including but not limited to Personally Identifiable Information (PII) or Intellectual Property (IP) does not get outside a corporate network or to a user without access.

To protect sensitive data, DLP systems use DLP policies to identify allowed user actions with sensitive data.

DLP policies are simple packages that contain specific conditions, actions, and exceptions that filter any type of data transfer from a user endpoint based on their content.

DLP solutions available on the market might be delivered to end-customers without any DLP policies. In this case, customers have to manually create DLP policies for an organization from scratch.

In some cases, DLP policies for DLP solutions are provided by integration service from a software vendor or its partner (integrator). In this case, the end-customer has to explain its needs to the integrator and when the integrator creates a policy and teaches the end-customer representative how to support, modify, and troubleshoot it in the future.

Some DLP solutions have built-in policy templates already integrated into a product. They allow easier deployment of DLP policies by assigning users the roles that are described in the policy template. Further, sometimes a policy template needs to be modified to fit particular customer needs.

In every case, the DLP product adoption in the organization is a labor-cost process, it requires at least one full-time dedicated person who knows the organization structure, its internal regulations, and the regulatory compliance which the organization must comply with. Usually, this person is an IT Security Officer.

Small business firms who delegate the IT infrastructure management to a Managed Service Provider (MSP)/Managed Security Service Provider (MSSP), do not have a person who can perform the role of IT Security Officer. MSP Administrators may not be familiar with the served customer's data flows at all. Improved DLP solutions are needed to address these issues.

SUMMARY

The proposed Automatic Policy Manager (APM) solution is an additional system and method for the existing DLP solutions to automatically create initial DLP policy in case it does not exist, and to adjust existing DLP policies over time for an organization.

The APM solution should monitor the data flows on the endpoints including but not limited to instant messages, emails, and outgoing files that the workload user initiates, and compare it with known-sensitive data of the organization including but not limited to Personal Health Information (PHI), Personal Identifiable Information (PII), Payment Card Industry Data Security Standard (PCI DSS), or any Intellectual Property (IP) information.

In case any sensitive data is detected by comparing intercepted data with a sensitive data classifier, a specific DLP rule can be created for a specific sensitive information category and a user group or type where the particular endpoint user belongs.

It can be assumed that people in a same organizational unit (in case the company is large enough) or any other group of people, for example, identified based on behavior, or inside a same organization (if the company is small enough), can share confidential data of any type without any limitation while data exchanges between units of organization, data exchanges to outside-of-the-organization recipients that include sensitive data (e.g., compliance, confidentiality, intellectual property) is treated as potentially dangerous and must be justified by the user who is initiated the data transfer. Such an assumption allows the product to ask for user justification once a sensitive data transfer is detected on the endpoint.

Depending on an organization size, a number of such users could be limited only to a trusted list of users.

The Automatic Policy Manager solution indicates the potentially unsafe operation for an endpoint user and ensures that a user knows what the user is doing and this operation is required to perform the user's business tasks (at least from the endpoint user's standpoint).

The APM solution allows the DLP Administrator, who is inspecting the autogenerated policy rules, to understand the user's reasoning for the operation that caused a particular DLP policy rule to be created.

Identified policy rules by the APM solution could be combined into groups based on sensitive data type, or based on classification of the users or their roles.

Created DLP rules can be applied to a known group of users or individuals automatically in case a DLP rule is created based on the trusted user justification.

Once an initial set of DLP rules is created and applied, the Automatic Policy Manager solution continues to monitor the data flows of trusted users to identify additional rules to adjust existing DLP policy rules to cover different use cases or extended sensitive data.

BRIEF DESCRIPTION OF DRAWINGS

The exemplary aspects of the invention will be better understood from the following detailed description of the exemplary embodiments of the invention with reference to the drawings.

DETAILED DESCRIPTION

Figure 1A:
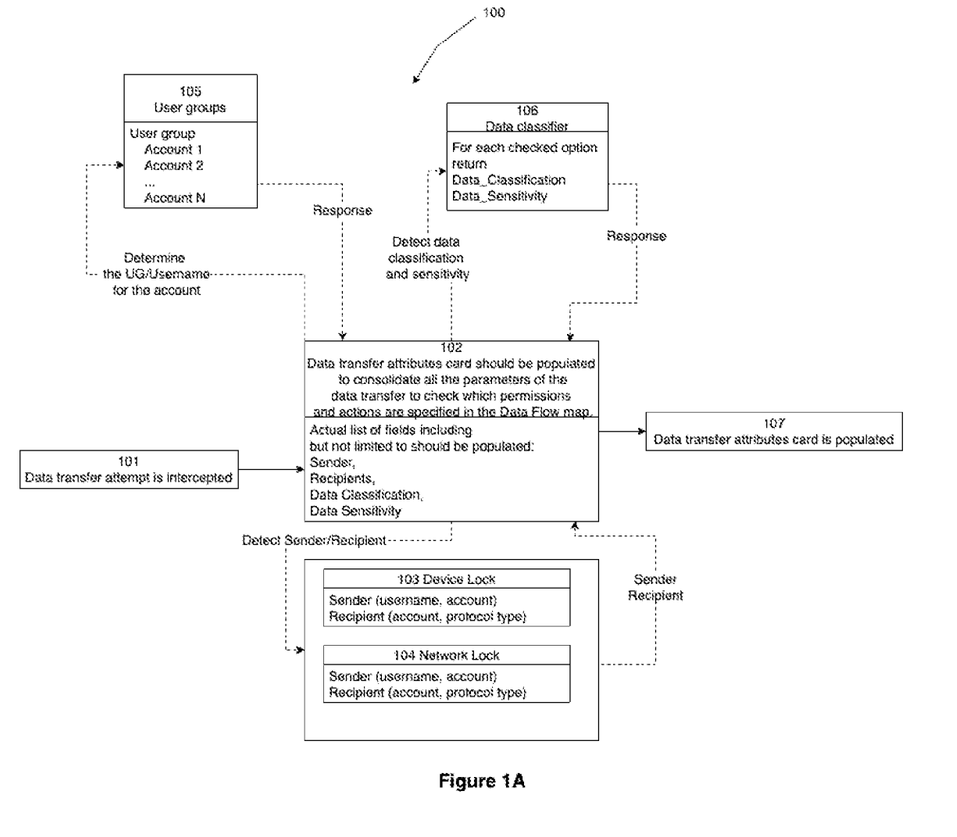
FIG. 1A and FIG. 1B show an exemplary aspect for data interception flow (Agent-side) according to an exemplary embodiment.
Figure 1B:
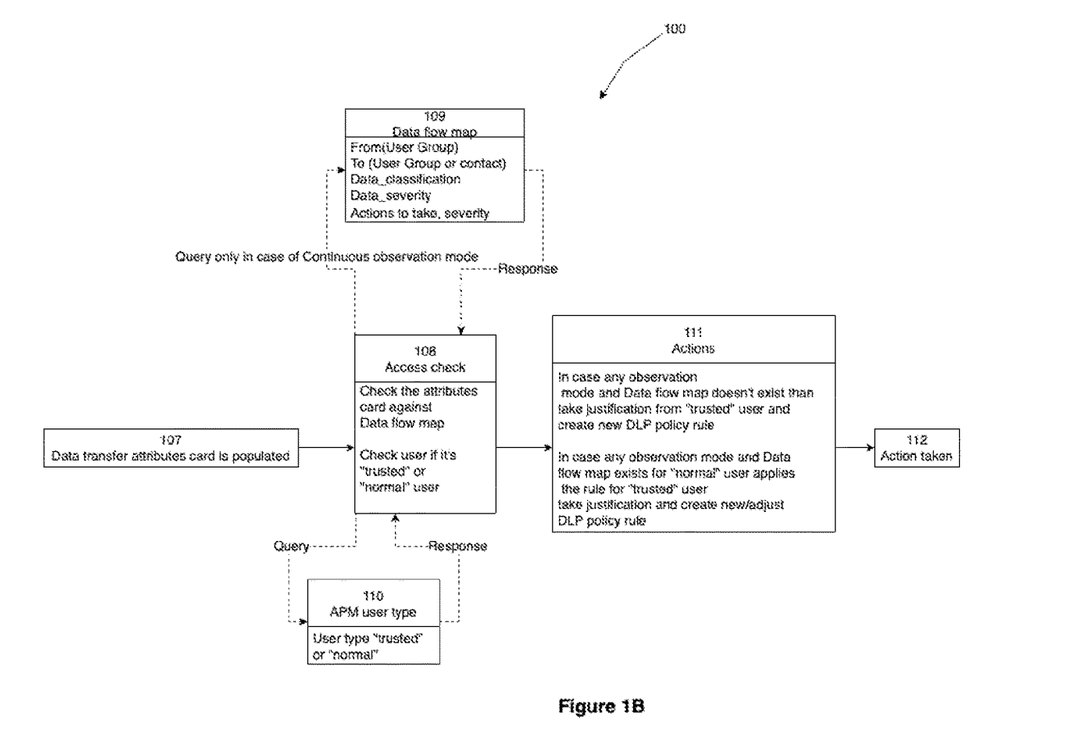

FIG. 1A and FIG. 1B show a data interception flow (Agent-side) according to an exemplary embodiment.

At some point, a user's data transfer attempt is intercepted (101).

Data transfer attributes card should be populated (102) to consolidate all the parameters of the data transfer to check which permissions and actions are specified in a DLP policy. Actual list of fields, including but not limited to, should be populated as Sender, Recipients, Data Classification, and Data Sensitivity.

User groups list (105) from the DLP system or any other system which defines user groups is provided.

DeviceLock (103) and NetworkLock (104) identify the sender and recipients.

Data classifier (106) contains all classified sensitive data and it will be populated by an external system, for example, by an existing DLP system.

To populate the fields of the transfer attributes card, the following actions need to be performed:
Determine the User group/Username for an account;
Detect data classification & sensitivity; and
Detect Sender and Recipient.

Once the data transfer attributes card is populated (107), a check of the "attributes card" against the DLP policy (109) needs to be performed (108).

Further, once the data transfer attributes card is populated (107), a check of the "attributes card" against the APM user type (110) needs to be performed (108).

Based on the check results, the following actions will be performed (111) depending on the system mode including but not limited to an "Initial observation" mode and a "Normal observation" mode.

In case the "Initial observation" mode is active and DLP policy does not exist, then the system takes justification from users based on logic described in [0054] and creates new DLP policy rules.

In case the "Normal observation" mode is active and DLP policy exists for "normal" users, the DLP policy rules will be applied.

For the scenarios here DLP policy rule does not exist for specific data, the same setting will be arranged as previously described.

In case the "Normal observation" mode is active and the DLP policy exists for "trusted" users for cases where DLP policy does not exist or should be updated, then take justification and create new/adjust DLP policy rules.

The proposed Automatic Policy Manager (APM) system could be an add-on to an existing DLP system and some components might overlap. These components would be also described here to define a complete process for the possibility of deep integration of the present invention to a user behavior analysis system.

Figure 2:
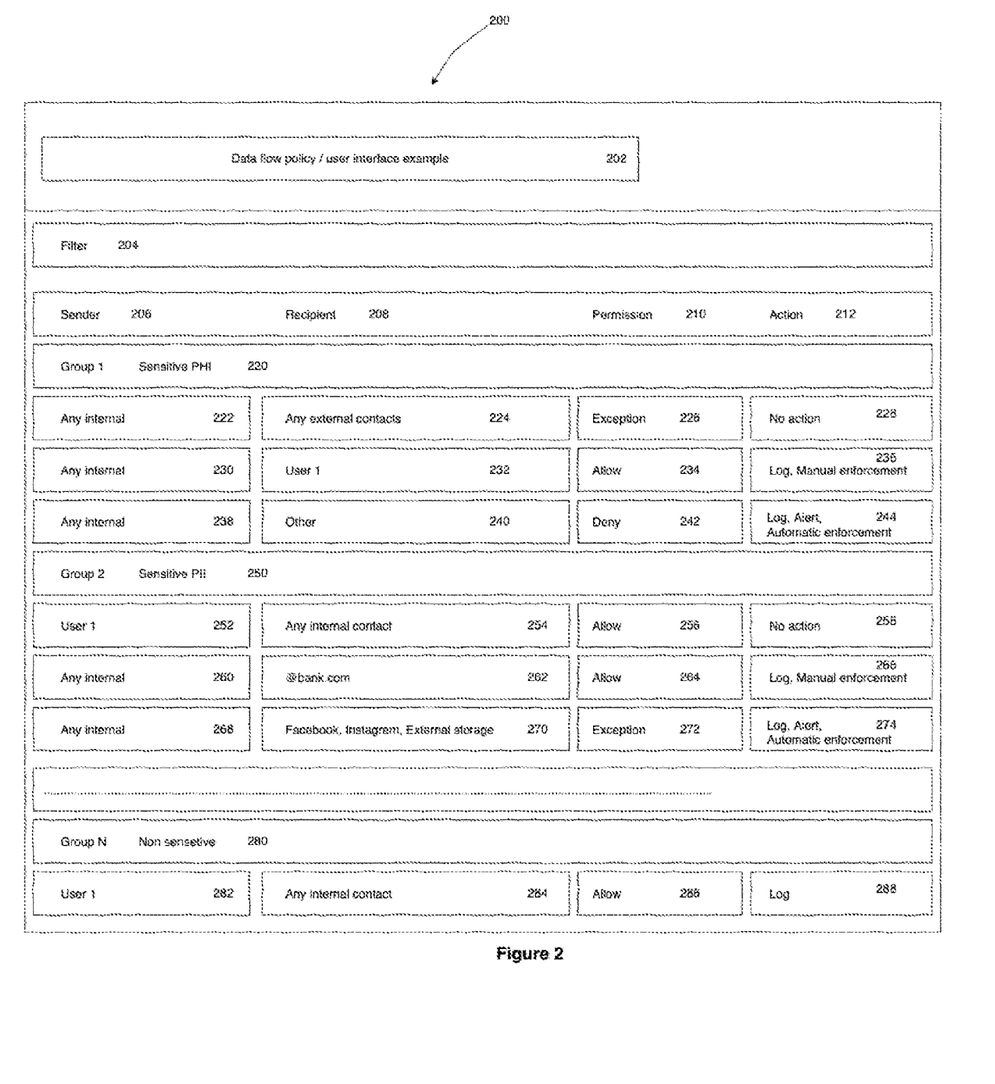
FIG. 2 shows a component of an Automatic Policy Manager (APM) system including an administrator user interface according to an exemplary embodiment.

FIG. 2 shows a component of the APM system that includes a user interface (202) that allows administrators to manage the DLP policies and view logged events with justifications.

The proposed Automatic Policy Manager (APM) system may include multiple components.

Figure 3:
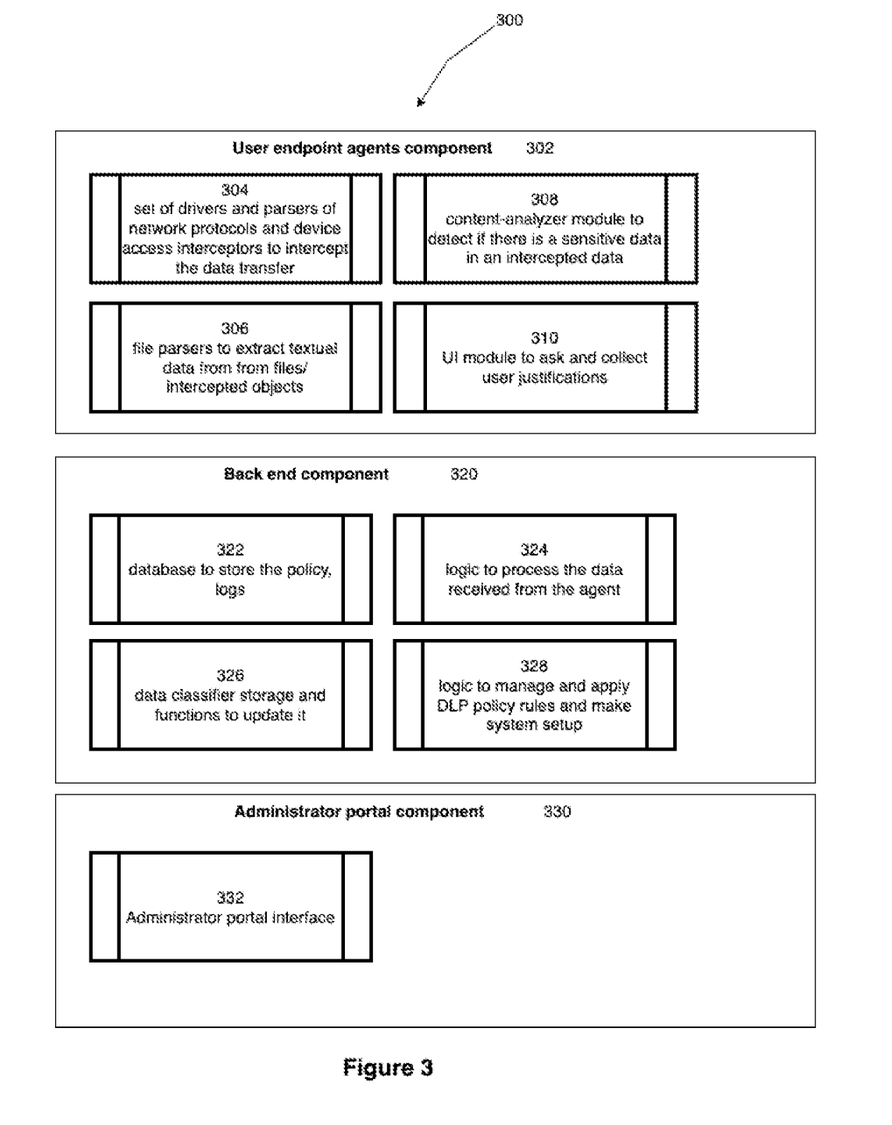
FIG. 3 shows overall system architecture according to an exemplary embodiment.

In an exemplary embodiment, as shown in FIG. 3, the following three components are used:
Agent Process at the endpoint component (302) (i.e., user endpoint agents component);
Backend component (320); and
Administrator portal component (330).

The first component of the Automatic Policy Manager (APM) is a specific agent process at the endpoint machine (see FIG. 1 and Brief Description of Drawings) that intercepts the data and compares it with known sensitive data by the system to record the data transfer event. Such events can be used for a DLP rule creation.

The agent for monitoring the events on the protected endpoint includes multiple components. In an exemplary embodiment shown in FIG. 3, four components are used, including:
set of drivers and parsers of network protocols and device access interceptors to intercept the data transfer (304);
file parsers to extract textual data from files/intercepted objects (306);
content-analyzer module to detect if there is a sensitive data in an intercepted data (308); and
UI module to ask and collect user justifications (310).

There could be two different types of users like a "normal" user and a "trusted" user. The UI module is used to allow one of those types of users to justify their sensitive data transfer so that system administrators could approve DLP policy rules created based on such justification.

The second component is a set of functions at the backend which process and store the policies and logs to manage and adjust DLP policies and specific DLP rules.

The backend of the Automatic Policy Manager (APM) system may include several components. In an exemplary embodiment shown in FIG. 3, four components are used, including:
a database to store the policy, logs (322);
a logic to process the data received from the agent (324);
a data classifier storage and functions to update it (326); and
a logic to manage and apply DLP policy rules and make system setup (328).

The third component of the Automatic Policy Manager (APM) system (330) includes a user interface (202), such as administrator portal interface (332) in FIG. 3, that allows administrators to manage the DLP policies and view logged events with justifications.

Administrators can see the new policies generated by the system as well as applied policies. All policies can be filtered (204) based on necessary criteria. Every policy includes but not limited to Sender (206), Recipient (208), Permission (210), Action (212). Sender (206) interface examples are shown as interface fields (222, 230, 238, 252, 260, 268, 282). Recipient (208) interface examples are shown as interface fields (224, 232, 240, 254, 262, 270, 282). Permission (210) examples are shown as interface fields (226, 234, 242, 256, 264, 272, 286). Action (212) examples are shown as interface fields (228, 236, 244, 258, 266, 274, 288). All policies are combined in groups based on data type (220, 250, 280).

The third component of Automatic Policy Manager (APM), as an administrator portal component (332), allows applications created by the system or other existing DLP policies to be applied to existing specific users or user groups. That might require close integration to existing DLP systems or any other system that classifies users for the DLP purposes.

Further, the third component of the APM, as administrator portal component (332), allows defining "trusted" and "normal" users to adjust system behavior to support the logic described above.

Moreover, the third component of the APM, as administrator portal component (332), allows to set up different system modes. In an exemplary embodiment, at least two system modes are used, including:
"Initial observation mode" to create initial set of DLP policies; and
"Normal observation" mode to adjust existing DLP policies or add new ones based on the changes in user-based data or sensitive data.

Automatic Policy Manager (APM) system works in the initial observation mode to automate initial DLP policy creation. Administrator activates it in the protection plan specifying the effective mode:

- Allow all—all operations with sensitive data are allowed and represented by the data flows on the DLP policy view.
- Justify all—all operations with sensitive data require workload user's one-time justification and represented by the data flows on the DLP policy view. All subsequent data transfers for {Sender, recipients, Data Sensitivity Type} are allowed without justification.
- Mixed—all data transfer operations with sensitive data within the organization or organizational unit are allowed while those that are directed to another User Group or outside the organization require one-time justification from the workload user.

In some effective modes, justification of sensitive data transfer is required. This means the user will have to provide a reason for him to perform a particular data transfer. Depending on a system setup, it could interrupt the data transfer process or allow it just by capturing justification.

At a later stage, in the process such justification can be used by the administrator for DLP policy rule approval or as justification for automatic application of the rule.

Described modes of the Automatic Policy Manager (APM) system could be applied to all the users or only to "normal" or "trusted" users.

These two groups of the users can be defined by the administrator manually.

"Trusted" users can be proposed by the system based on the function or machine learning algorithms identified based on user data and user behavior including but not limited to the period of the user registration in the system, social rating, and distance from group center of mass (core group users).

When the "initial observation" mode is activated, the DeviceLock Services, running on the endpoints, start tracking all data moves (flows) by intercepting the communications made using any controlled channel specified in this document and collect the data to build the DLP policy. The minimum period needed for observation is one week (up to one month).

When the observation is over, depending on the type of users involved, there could be different scenarios on how to apply identified DLP policies. In an exemplary embodiment, two scenarios are used, such as:

- Manual review and DLP policies application is used when "normal" users were involved into Initial observation mode; and
- Automatic DLP policies application is used when "trusted" users were involved into "Initial observation" mode.

In case of manual DLP policies review, for example, the administrator takes the business owner to a meeting and shows what has been observed to check if there are any visible violations of data security. Based on that data, the business owner adjusts one or more restrictions on the discovered data flows.

At this point, the initial DLP policy rule is approved and can be enforced for a known user groups or individuals.

In case of an automatic DLP policies application, all DLP policies observations are collected from trusted users. DLP policy rules can be enforced automatically to the group of users where the trusted user belongs. It can be done by the administrator or completely automatically based on the system setup and availability of the dedicated administrator in the organization.

For the automatic rule enforcement, it is required to have all users grouped by a certain criterion, such as but not limited to organizational or behavioral. Such grouping will be performed by other security/data flow/behavioral analysis systems.

New rule can be automatically enforced only to the users who are close to the core of the group or to the trusted users.

To identify such users, it is required to define a "Radius Threshold" (RT) parameter to define the area of interest where DLP policy rules will be enforced automatically.

Figure 4:
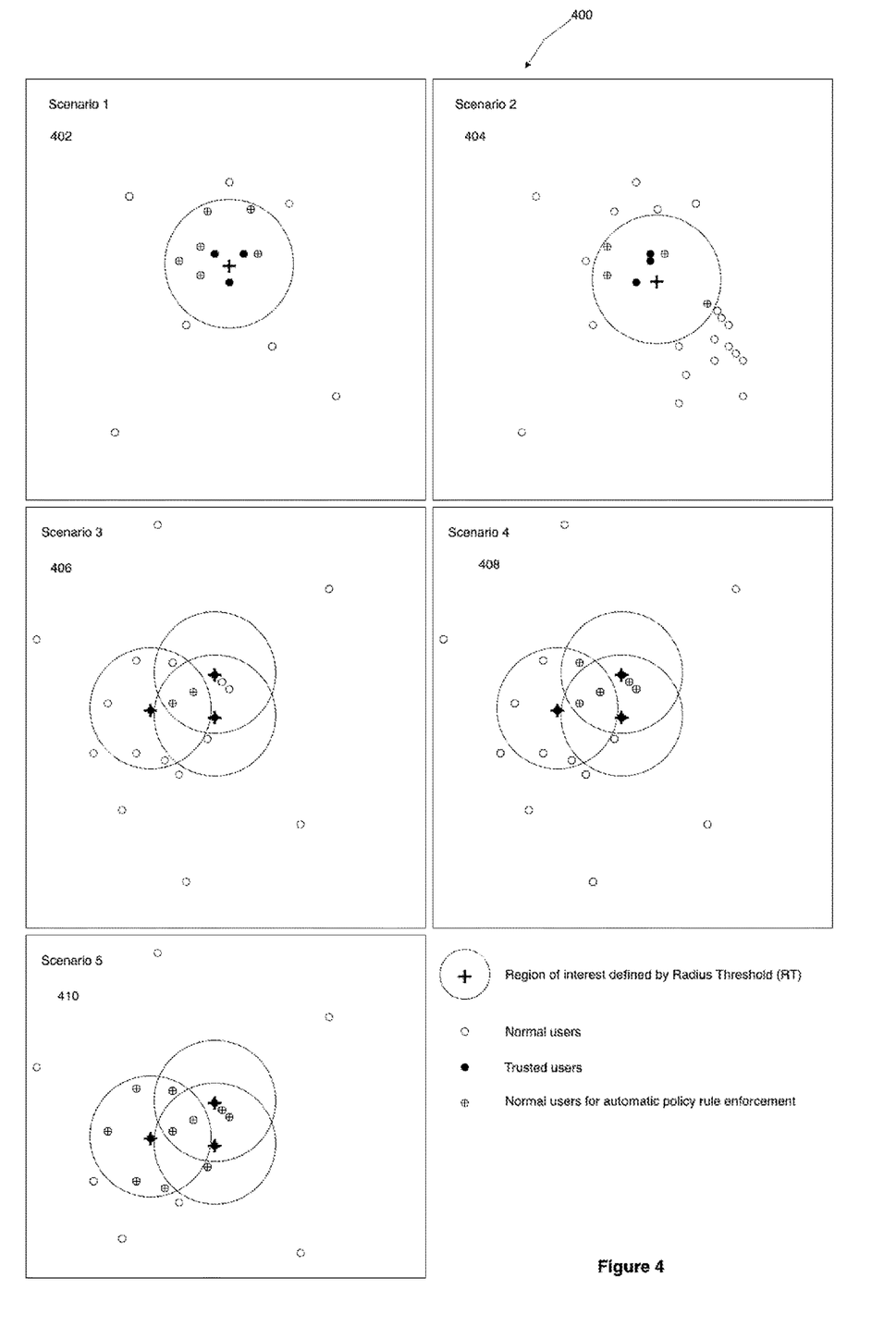
FIG. 4 shows a logic to automatically enforce DLP policy rules to a group of the users based on their behavior according to an exemplary embodiment.

For all users within the area of interest, new DLP policy rules will be enforced automatically based on the logic including but not limited to the following scenarios 400 shown in FIG. 4.

With Scenario 1 (402), users for automatic policy rule enforcement are identified based on the RT from the "trusted" users center of mass of the group. All users are in distance to the user that is equal or less than RT from the "trusted" users center of mass of the group.

Scenario 2 (404) users for automatic policy rule enforcement are identified based on the RT from the center of mass of the whole group. All users are in distance to the user that is equal or less than RT from the center of mass of the whole group.

Scenario 3 (406) users for automatic policy rule enforcement are identified based on the RT/area of interest from each "trusted" user. All users are in the area of overlapping areas of interest of all "trusted" users.

Scenario 4 (408) users for automatic policy rule enforcement are identified based on the RT/area of interest from each "trusted" user. All users are in the area of overlapping areas of interest of at least 2 but not limited to this number of "trusted" users (it will be a parameter of the system).

Scenario 5 (410) users for automatic policy rule enforcement are identified based on the RT/area of interest from each "trusted" user. All users are in the area of interest of at least one of "trusted" users.

For all users outside of described scenarios above, additional steps will be taken by the administrator to apply DLP policy rules for such users. Once the Automatic Policy Manager (APM) system passes at least one full cycle in an initial observation mode and some policies are created and applied, it continues operation in a "Normal observation" mode.

The Automatic Policy Manager (APM) system works in "Normal observation" mode to adjust existing DLP policies. In this mode, the Automatic Policy Manager (APM) system can work with the policies created by itself in "Initial observation" mode or connect to existing DLP systems. It might require close integration to existing data flow systems.

The Automatic Policy Manager (APM) system in "Normal observation" mode can continue to learn and add new data flows or adjust existing rules to the policy due to the fact that sensitive data categories or the content of such categories is continuously changing. Depending on the type of users involved, "normal" or "trusted," those changes might be applied manually by the administrator or automatically.

Based on the above descriptions, an exemplary aspect of the present invention is directed to a system to create an initial list of DLP policies and adjust a DLP policies list overtime.

The exemplary system includes a processor coupled to a memory storing instructions, the processor being configured to implement the instructions to process a plurality of agents running at an endpoint to intercept a data transfer in a network traffic, intercept the data transfer in a device access, extract textual data from intercepted objects, analyze content for detection of sensitive data in an intercepted data, record justification of the data transfer, prevent the data transfer in case the data transfer is not allowed by rules, and create new data flow/DLP policy rule, cloud server side to store a database of a DLP policy and logs, process data received from endpoints, store a data classifier database and functions to update the data classifier database, and manage and apply DLP policy rules and make system setup, and an admin portal with a user interface to set up the system by an administrator to allow to define a normal user and a trusted user, define an observation mode type, and define a protection plan effective mode, manage the DLP policy and view logged events with justifications, and enforce DLP policies to a different sensitive data type for defined user groups or individuals.

Another exemplary aspect of the present invention is directed to a method for creating an initial list of DLP policies and adjusting a DLP policies list overtime.

The method includes, through a plurality of agents running at an endpoint, intercepting a data transfer in a network traffic, intercepting the data transfer in a device access, extracting textual data from intercepted objects, analyzing content for detection of sensitive data in an intercepted data, recording justification of the data transfer, preventing the data transfer in case the data transfer is not allowed by rules, and creating new data flow/DLP policy rule, through a cloud server side, storing a database of the DLP policy and logs, processing data received from endpoints, storing data classifier database and functions to update data classifier database, and managing and applying DLP policy rules and make system setup, and through an admin portal with a user interface, setting up a system by an administrator to allow to define a normal user and a trusted user, define a center of mass of a group or a center of mass of trusted users, identify and propose trusted users based on user data using machine learning algorithms, define an observation mode type, and define a protection plan effective mode, managing a DLP policy and viewing logged events with justifications, and enforcing DLP policies to different sensitive data type for defined user groups or individuals to identify an area of interest, define a radius threshold, identify users based trusted users and areas of interest to automatically apply new DLP policy rules, and identify users outside of an area of interest for an administrator decision on a manual policy rule enforcement if any.

It is noted that some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "analyzing," "identifying," "defining," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus should be specially constructed for the required purposes. Computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves.

Various systems may be used with programs and modules in accordance with the examples herein, including the use of a specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Moreover, the various functions described can be performed in a single unit or can be spread across a number of components in any number of ways. If desired, the instructions can be stored on the medium in a compressed or encrypted format.

The invention claimed is:

1. A method for automatically enforcing a Data Loss Prevention (DLP) rule in a computing system accessed by a plurality of authorized users, the method comprising:

defining a trusted user group of the computing system, a subset of normal authorized users, comprising at least 3 trusted users for a first time period;

identifying a first data category from the data transmitted by the trusted users during the first time period; establishing a first rule for transmission of the data in the first data category that applies to the trusted user group, the first rule comprising a permission and an action corresponding to a recipient of the data;

storing the first rule in a database; intercepting behavior data transmitted by trusted users and normal authorized users of the computing system over a second time period; identifying a region of interest from the intercepted behavior data, wherein the region of interest is a radius threshold calculated from the intercepted behavior data of at least three trusted users of the computing system during the second time period;

locating the normal authorized users either inside or outside the region of interest based on the intercepted behavior data; and enforcing the first rule for transmission of data for all normal authorized users within the region of interest.

2. The method of claim 1, wherein the center of the radius threshold is the center of mass for the trusted users.

3. The method of claim 1, wherein the first rule for transmission of data is adjusted based on a change in behavior by the trusted users.

4. The method of claim 1, wherein enforcing the first rule for transmission of data comprises a query to the sender of the data regarding the purpose of the transmission.

5. The method of claim 4, wherein the response to the query is used to create a second rule for transmission of data.

6. The method of claim 5, wherein the second rule for transmission of data is applied to data transmissions by trusted and normal authorized users.

7. A method for automatically enforcing a Data Loss Prevention (DLP) rule in a computing system accessed by a plurality of normal authorized users, the method comprising:
defining a trusted user group of the computing system from among the normal authorized users comprising at least 3 trusted users for a first time period;
identifying a first data category from the data transmitted by the trusted users during the first time period;
establishing a first rule for transmission of the data in the first data category that applies to the trusted user group, the first rule comprising a permission and an action corresponding to a recipient of the data;
storing the first rule in a database; intercepting data transmitted by trusted users and normal authorized users of the computing system over a second time period; identifying a plurality of regions of interest from the intercepted data, wherein each region of interest is defined by a radius threshold calculated from the intercepted behavior data for a member of the trusted user group of the computing system during the second time period; and
enforcing the first rule for transmission of data for authorized users within overlapping areas of the plurality of regions of interest.

8. The method of claim 7, wherein there are three radii of interest calculated for three trusted users and the overlapping areas of the plurality of regions of interest are defined as regions where two radii of interest intersect.

9. The method of claim 7, wherein there are three radii of interest calculated for three trusted users and the overlapping areas of the plurality of regions of interest are defined as regions where three radii of interest intersect.

10. The method of claim 7, wherein there are three radii of interest calculated for three trusted users and the first rule for transmission of data is enforced for any normal authorized user within any of the three radii of interest.

11. The method of claim 7, wherein enforcing the first rule for transmission of data comprises a query to the sender of the data regarding the purpose of the transmission.

12. The method of claim 11, wherein the response to the query is used to create a second rule for transmission of data.

13. The method of claim 12, wherein the second rule for transmission of data is applied to data transmissions by trusted and normal authorized users.

14. A system for automatically enforcing a Data Loss Policy (DLP) at a computer system endpoint, the system comprising:
a microprocessor coupled to a nontransitory storage;
a plurality of authorized users, wherein the plurality of authorized users comprise trusted users and normal users;
a plurality of agents, under control of the microprocessor, running at the endpoint, wherein the plurality of agents are configured to:
intercept a data transfer between the plurality of authorized users of the computer system at the end point;
extract textual data from intercepted data;
analyze content for detection of sensitive data in the intercepted data; and
create a first DLP rule, wherein the first rule comprises a permission and an action corresponding to a recipient of the intercepted data;
a database configured for storing a plurality of DLP rules; and
a machine-learning engine under program control of the microprocessor and configured for processing data received from endpoints and classifying data transfers made by the plurality of authorized users at the endpoint, wherein the classification comprises establishing a region of interest and a radius threshold comparing the trusted users with the-normal users and wherein the plurality of agents are further configured to enforce the first DLP rule for the normal users located within the radius threshold of a trusted user.

15. The system of claim 14, wherein the center of the radius threshold is the center of mass for the trusted users.

16. The method of claim 14, wherein the center of the radius threshold is the center of mass for all authorized users.

17. The method of claim 14, wherein the first DLP rule comprises a query to the sender of the data regarding the purpose of the transmission.

18. The method of claim 14, wherein the machine-learning engine is configured to calculate a radius of interest for three trusted users and the normal users are within the radius threshold of a trusted user if within an area where two radii of interest overlap.

19. The method of claim 14, wherein the machine-learning engine is configured to calculate a radius of interest for three trusted users and the normal users are within the radius threshold of a trusted user if the normal users are within an area where three radii of interest overlap.

20. The method of claim 14, wherein the machine-learning engine is configured to calculate a radius of interest for three trusted users and normal users are within the radius threshold of any trusted user.

* * * * *